United States Patent [19]

Tsunekawa

[11] Patent Number: 4,566,775

[45] Date of Patent: Jan. 28, 1986

[54] EXPOSURE CONTROL APPARATUS BASED ON A MULTIMETERING SYSTEM

[75] Inventor: Tokuichi Tsunekawa, Kanagawa, Japan

[73] Assignee: Canon Kabushiki Kaisha, Tokyo, Japan

[21] Appl. No.: 736,540

[22] Filed: May 21, 1985

Related U.S. Application Data

[63] Continuation of Ser. No. 513,153, Jul. 13, 1983.

[30] Foreign Application Priority Data

Jul. 16, 1982 [JP] Japan ................................ 57-124183
Jul. 16, 1982 [JP] Japan ................................ 57-124184
Jul. 22, 1982 [JP] Japan ................................ 57-127953

[51] Int. Cl.[4] ............................................. G03B 7/08
[52] U.S. Cl. .................................................. 354/432
[58] Field of Search ........................................ 354/432

[56] References Cited

U.S. PATENT DOCUMENTS

4,364,650 12/1982 Terashita et al. ................... 354/432
4,394,078 7/1983 Terashita ............................. 354/432
4,429,969 2/1984 Saegusa ............................... 354/432
4,443,080 4/1984 Saegusa ............................... 354/432

*Primary Examiner*—Russell E. Adams
*Attorney, Agent, or Firm*—Toren, McGeady, Stanger, Goldberg & Kiel

[57] ABSTRACT

A meter sensitivity pattern control method for cameras in which an output of a first light metering circuit for the brightness of an object of principal photographic interest is compared with outputs of a plurality of second light metering circuits for brightness of different portions of the environment surrounding the object by a corresponding number of comparing circuits. Thereby one second light metering circuit having an output which lies in a predetermined range different from the output of the first light metering circuit and another second light metering circuit having an output which lies outside the predetermined range are selected for their different contributions to an exposure value. The thus-differentially weighed outputs of the second light metering circuits are computed with the output of the first light metering circuit producing light value information.

2 Claims, 10 Drawing Figures

EXPOSURE CONTROL APPARATUS BASED ON A MULTIMETERING SYSTEM

This is a continuation of application Ser. No. 513,153, filed July 13, 1983.

BACKGROUND OF THE INVENTION

1. Field of the Invention

This invention relates to a meter sensitivity pattern control method for cameras making it possible to take photographs with good emphasis balance on a subject of principal interest and on the environment surrounding the subject.

2. Description of the Prior Art

In general, the photographic object has a non-uniform brightness distribution. With a finder image where, for example, the central area is higher or lower in brightness than the surrounding area, when the brightness difference is small, the object may be measured by a light meter of an average sensitivity pattern without an unduly large exposure error. However, when the brightness of the various portions of the object happen to differ greatly from each other, the use of an average weight light meter never assures accurate exposure determination. For example, in a given photographic situation where the environment surrounding an object of principal interest has a far higher brightness than the central area, the light sensor responds largely to the area surrounding the object, as if great emphasis were given to the surrounding area. In this situation, therefore, the light value merely represents only the brightness level of the environment surrounding the object of principal photographic interest. If the camera is allowed to set exposure factors based on this light value, it is impossible to obtain proper exposure for the central area of the object, although the exposure value is correct for the area surrounding the object.

In most photographic situations, the subject of principal photographic interest lies in the central area of the finder field of view. Therefore, by such a meter sensitivity pattern, accurate light values cannot always be obtained. And it is not suited for use in general-purpose cameras.

Attempts have been made to eliminate the drawbacks of the above overall field of view light metering method by limiting the meter sensitivity to the main area of the object, as in so-called spot metering. Such a spot metering method though it assists the photographer in assessing a lighting situation has, however, the disadvantage that as the object brightness is not uniform over the entire area of the finder image, variations in the brightness of the area surrounding the spot area are ignored.

To overcome this disadvantage, it is proposed that two light meters be used, one of which is positioned to receive a light beam coming from the central area of the object, and another light meter which is positioned to receive a light beam coming from the surrounding area. They are used in combination with an electronic selection circuit, responsive to bringing the brightness difference of the central and surrounding areas to a predetermined level for selecting either one or both of the two light meters and for connecting them to an exposure value computer as, for example, disclosed in Japanese Laid-Open Patent Application No. Sho 57-89727.

However, even such a light meter arrangement can only change its light responsive range in three different areas of the object; namely, the central area, the surrounding area and a combined area thereof, and it is incapable of sensing the intermediate portions. For example, when the upper portion of the surrounding area has a greater brightness portion than the other portions, the arrangement is automatically rendered responsive only to the central area. This makes it impossible to set the overall field of view light metering mode without excluding one of the portions of the zone surrounding the central area, which is of far greater brightness.

A first object of the present invention is, to provide a light metering system for a camera in which a first light metering circuit responsive to a central area of a picture frame produces an output representing the brightness of an object of principal photographic interest, and a plurality of second light metering circuits responsive to respective portions of a surrounding area of the picture frame produce outputs representing the brightness of the surroundings. One or more outputs of the second light metering circuit, which fall within a range different from the output of the first light metering circuit, are computed with the output of the first light metering circuit, producing an output that is the brightness information.

A second object of the present invention is to provide a light metering system for a camera in which an output of a first light metering circuit for brightness of an object of principal photographic interest is compared with outputs of a plurality of second light metering circuits for brightness of different portions of the environment surrounding the object by a corresponding number of comparing circuits. Thereby one second light metering circuit, the output of which lies in a predetermined range different from the output of the first light metering circuit, and another second light metering circuit, the output of which lies outside the predetermined range, are selected for their different contributions to an exposure value. The thus-differentially weighed outputs of the second light metering circuits are computed with the output of the first light metering circuit producing the light value information.

A third object of the present invention is to provide a light metering system for a camera in which effects on meter sensitivity by a certain portion of the object is eliminated, depending on the camera shooting position for excellent photography.

SUMMARY OF THE INVENTION

The objects of the invention are obtained in a light metering system for a camera which includes a first light metering means for metering the brightness of a certain part of an object to be photographed. The first means produces an electrical signal corresponding to the brightness of the certain part of the object. A plurality of second light metering means are provided for metering brightness of respective different parts which are different from one another and from the certain part of which the brightness is sensed by the first light metering means. The plurality of second light metering means produces respective outputs corresponding to the brightness of the respective different parts of the object.

The apparatus also includes computing means for computing an output of the first light metering means and outputs of each of the second light metering means as well as exposure control means for controlling the amount of exposure in accordance with the output of the computing means. A plurality of switching means is arranged between the respective second light metering means and the computing means. The plurality of switching means are selectively turned off to hinder the output or outputs of one or more of the second light metering means. The apparatus also includes control means for controlling the ON and OFF operation of each of the plurality of switching means.

DESCRIPTION OF THE PREFERRED EMBODIMENTS

The present invention will be described in conjunction with the embodiments thereof by reference to the drawings.

Figure 1:
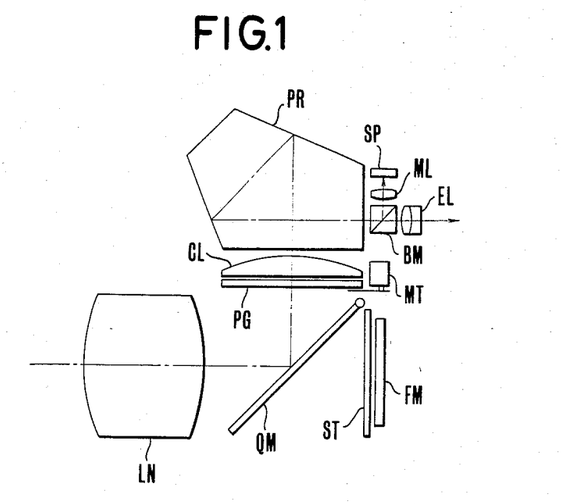
FIG. 1 is a schematic vertical sectional view of a camera employing one form of the present invention.

FIG. 1 illustrates a single lens reflex camera in which respective reference symbols and the elements they identify are: LN an interchangeably objective lens, QM a quick return mirror, PG a focusing screen, CL a condenser lens, PR a penta prism, BM a beam splitter, EL an eyepiece, ML a collection lens for light metering, SP a light meter, MT an exposure value display in the form of a current meter or the like, ST a shutter and FM a film.

Figure 2:
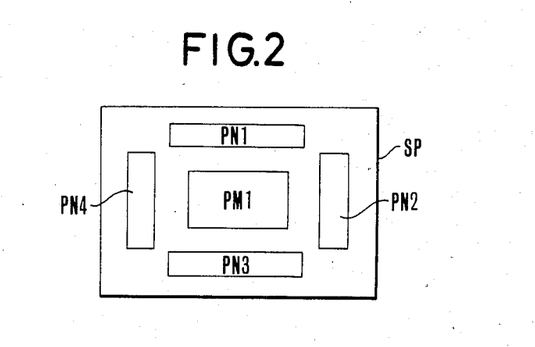
FIG. 2 is a plan view of a meter sensitivity pattern in the camera of FIG. 1.

FIG. 2 illustrates a sensitivity pattern of the light meter SP of FIG. 1. The size of the image receiving surface of the light meter SP is proportional to the size of the picture frame. A photoelectric transducer element PM1 responds to a central area of the picture frame in which an image of an object of principal photographic interest often lies. Photoelectric transducer elements PN1-PN4 respond to respective portions of a surrounding area of the picture frame in which the environment surrounding the object lies, the photoelectric transducer elements PN1 and PN3 being responsive to the upper and lower portions of the picture frame, and the photoelectric transducer elements PN2 and PN4 being responsive to the right and left hand portions of the picture frame respectively.

Figure 3:
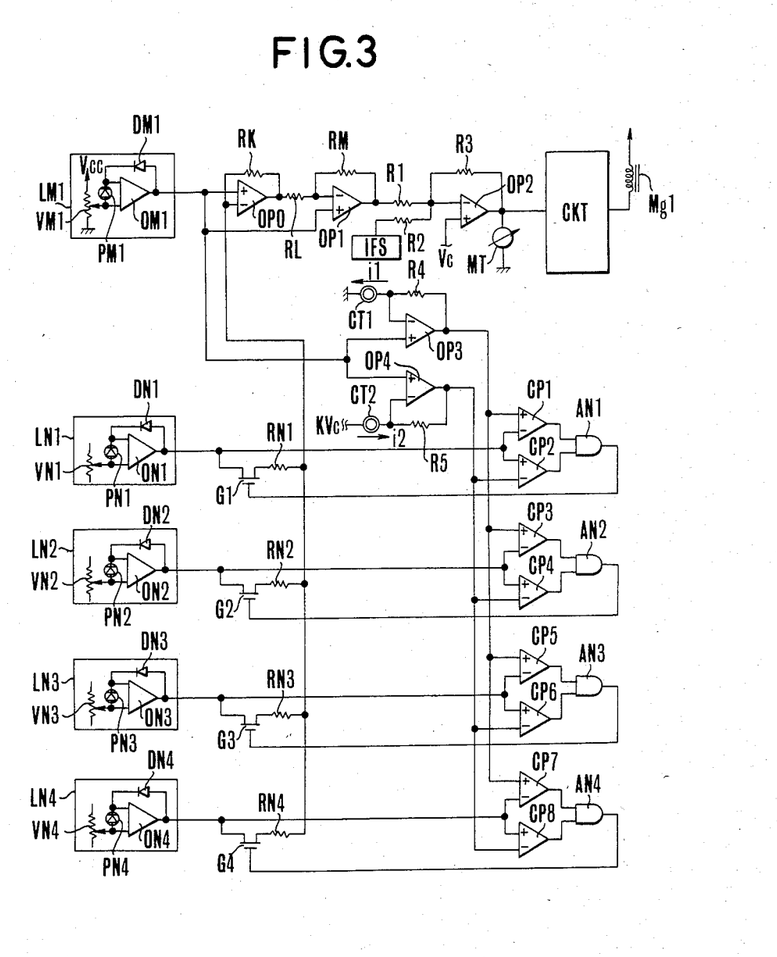
FIG. 3 is an electrical circuit diagram of a control circuit of the camera of FIG. 1.

Referring now to FIG. 3, there is shown a control circuit of the camera of FIG. 1, including a first light metering circuit LM1 for the brightness of the central area of the object, and four second light metering circuits LN1, LN2, LN3 and LN4 for the brightness of the upper, lower, right hand and left hand portions of the object. In these light metering circuits LM1, LN1-LN4, there are level setting resistors VM1, VN1-VN4, the photovoltaic cell type photoelectric transducer elements PM1, PN1-PN4, high input impedance operational amplifiers OM1, ON1-ON4, and logarithmic compression elements DM1, DN1-DN4 for producing outputs proportional to the logarithms of the photo-currents from the photoelectric transducer elements PM1, PN1-PN4. The circuit further includes computation resistors RK, RL, RM, RN1-RN4 and R1-R5, constant current sources CT1 and CT2, reference voltage sources VC and KVC, operational amplifiers OP-0-OP4, comparators CP1-CP8, AND gates AN1-AN4, analog gates G1-G4, an exposure factor setting circuit IFS, and a control circuit CKT of known construction responsive to the output of the computer circuit for controlling the period of actuation of a solenoid Mg1 in cooperation with the shutter ST (or diaphragm).

The operation of such a circuit is as follows: The first light metering circuit LM1 produces an output VOM1 proportional to the logarithm of the intensity of brightness of the central area of the object, or the brightness of the object of principal photographic interest, the output of which is then applied to the operational amplifiers OP0 and OP1 and also to the operational amplifiers OP3 and OP4. The latter operational amplifiers OP3 and OP4 have respectively outputs VOP3 and VOP4, which serve as discrimination control reference voltages expressed by $VOM1+\alpha$ and $VOM1-\beta$ respectively. Letting i1 and i2 denote the constant currents of the source CT1 and CT2, we have $$VOP3 = VOM1 + \alpha = VOM1 + i1 \cdot R4$$

$$VOP4 = VOM1 - \beta = VOM1 - i2 \cdot R5$$

The output VOP3 from the operational amplifier OP3 is applied to the inputs of the comparators CP1, CP3, CP5 and CP7, and the output VOP4 from the operational amplifier OP4 is applied to the inputs of the comparators CP2, CP4, CP6 and CP8, while the opposite inputs of the comparator pairs CP1 and CP2, CP3 and CP4, CP5 and CP6, and CP7 and CP8 are connected to the respective outputs of the second light metering circuits LN1, LN2, LN3 and LN4, the outputs of which represent the logarithms of the brightness of the objects surroundings. Only when each of the outputs VON1, VON2, VON3 and VON4 of the second light metering circuits LN1, LN2, LN3 and LN4 falls within a range of voltages from VOP3 to VOP4, do all the outputs of the comparators CP1 through CP8 become high level at which time the AND gates AN1 through AN4 turn on the analog gates G1 through G4. Therefore, all the outputs VON1, VON2, VON3 and VON4 of the second light metering circuits LN1, LN2, LN3 and LN4 are applied through the analog gates G1, G2, G3 and G4 to the operational amplifier OP0, computing with the output VOM1 of the first light metering circuit LM1. The output of the operational amplifier OP0 is applied through the operational amplifier OP1 to the operational amplifier OP2 for computation with the output of the exposure factor setting circuit IFS. The output of the operational amplifier OP2 represents an exposure value which is displayed by the meter MT and in accordance with which the operation of the exposure determining means is controlled by the circuit CKT.

Next, a back-lighting situation where, for example, the upper portion of the object has a much greater brightness than the image of the object of principal interest in the central area of the picture frame will be discussed. Then, since the output of the photoelectric transducer element PN1 is higher than that of the PM1 by such a great difference that the output VON1 of the second light metering circuit LN1 and the discrimination control reference voltage VOP3 are in the relation VON1>VOP3, the comparator CP1 changes its output level to L, thereby the analog gate G1 is turned off. Thus, the output VON1 of the second light metering circuit LN1 does not contribute to the computation of a light value. Therefore, the other outputs of the second light metering circuits LN2-LN4, which lie between the discrimination conrol reference voltages VOP3 and VOP5, are computed with the output of the first light metering circuit LM1 by the operational amplifiers OP0 and OP1. Then, the output of the exposure factor setting circuit IFS by the operational amplifier OP2 produces an exposure value in accordance with which the operation of the exposure determining means is controlled by the circuit CKT.

For another given photographic situation where the object of principal interest is light in a dark environment as in the theater, the outputs VON1-VON4 of the second light metering circuits LN1-LN4 all become smaller than the reference voltage VOP5, thereby the outputs of the comparators CP2, CP4, CP6 and CP8 change to a low level, turning off the analog gates G1-G4. Thus, only the output of the first light metering circuit LM1 is factored into the exposure value.

Figure 4:
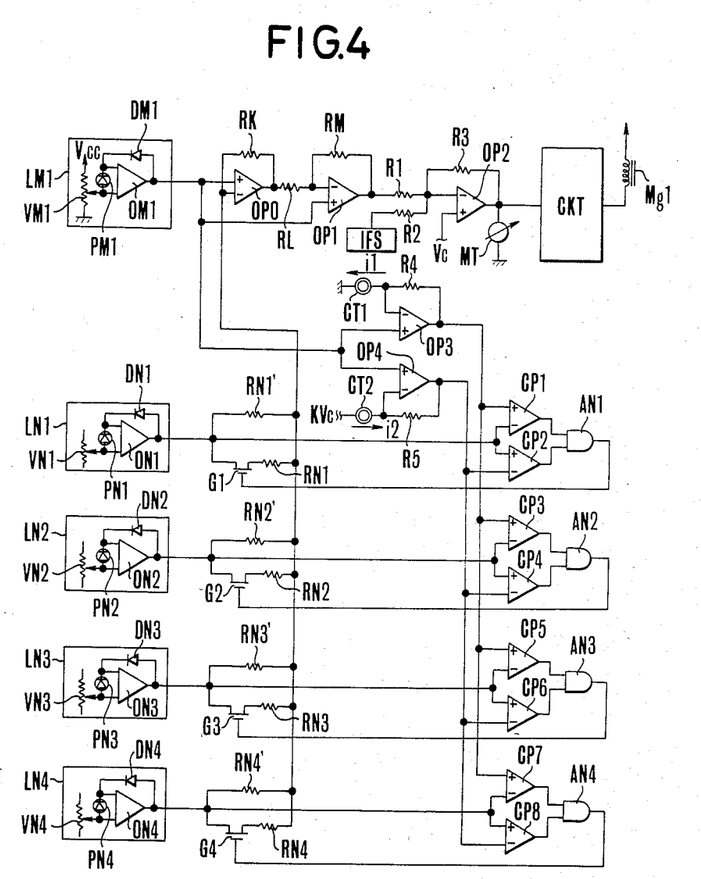
FIG. 4 is an electrical circuit diagram of another control circuit of the camera of FIG. 1.

FIG. 4 illustrates another example of the control circuit for the camera of FIG. 3, wherein the same reference characters have been employed to denote the parts similar to those shown in FIG. 3, and their detailed explanation is omitted. The computation resistors RN1'-RN4' are connected across the series circuits of the analog gates G1-G4 and the computation resistors RN1-RN4 respectively.

The operation of the circuit of FIG. 4 is as follows: The outputs VON1, VON2, VON3 and VON4 of the second light-metering circuits LN1, LN2, LN3 and LN4, after having been processed based on the values of the pairs of the parallel-connected resistors RN1 and RN1', RN2 and RN2', RN3 and RN3', and RN4 and RN4', are applied to the operational amplifier OP0 for computation with the output VOM1 of the first light metering circuit LM1.

Therefore, when the object of principal photographic interest is to be photographed in a light background, as the output of the photoelectric transducer element PN1 is much higher than that of the PM1, the output VON1 of the second light metering circuit LN1 and the discrimination control reference voltage VOP3 are put into the relation VON1>VOP3, thereby the output of the comparator CP1 becomes low level. Then the analog gate G1 is turned off, applying the output VON1 of the second light metering circuit LN1 through the resistor RN1' to the operational amplifier OP0, leaving the other outputs VON2, VON3 and VON4 of the second light metering circuits LN2, LN3 and LN4, which lie between the discrimination control reference voltages VOP3 and VOP5, processed by the respective pairs of the parallel-connected resistors RN2 and RN2', RN3 and RN3', and RN4 and RN4', before application to the operational amplifier OP0. Then, the output of the operational amplifier OP0 is computed with the output VOM1 of the first light metering circuit LM1 by the operational amplifier OP1. It should be pointed out that the previous resistance values of the RN1'-RN4' are greater than those of the resistors RN1-RN4 so that when the analog gates G1-G4 are turned off, the contribution of the second light metering circuits LN1-LN4 to the light value computation can be reduced.

In the photographic situation where the object of principal interest is light, and the environment surrounding the object is dark as in the theater, as the outputs VON1-VON4 of the second light metering circuits LN1-LN4 become smaller than the reference voltage VOP5, the outputs of the comparators CP2, CP4, CP6 and CP8 become low level, thereby the analog gates G1-G4 are turned off. Therefore, the outputs of the second light metering circuits LN1-LN4 are applied through the resistors RN1'-RN4' to the operational amplifier OP1 for computation with the output VLM1 of the first light metering circuit LM1. The thus-obtained light value is factored into the exposure value.

In other words, with the circuit of FIG. 4, when the difference between the brightness of the central area and any one of the portions of the surrounding area of the object is small, the emphasis on that surrounding portion is increased, while when large, it is decreased. Thus, the meter SP sensitivity pattern is differentially weighed in a selected area or areas depending upon the brightness difference. Thereby it is possible to first take into account the object of principal photographic interest in any photographic situation, while still permitting a good balance of emphasis on the object and on the environment, when deriving an exposure value.

Another embodiment of the present invention will be described by reference to FIGS. 5 to 7.

Figure 5:
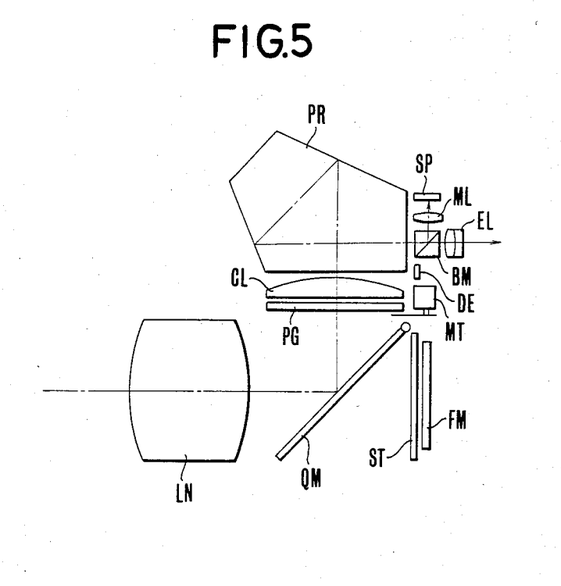
FIG. 5 shows another embodiment of the invention.

FIG. 5 illustrates a single lens reflex camera which differs from that of FIG. 1 in that there is provided a device DE for detecting a change of the shooting position of the camera positioned between the exposure value display MT and the beam splitter BM.

Figure 6:
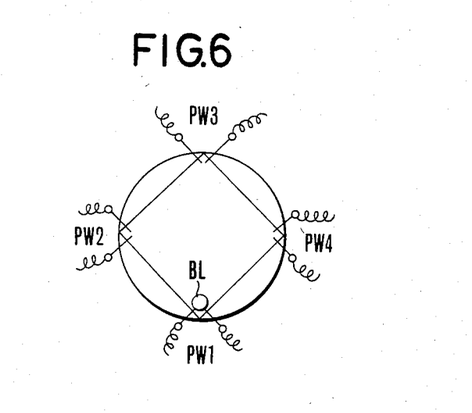
FIG. 6 is an elevational view of a device for detecting the difference in the shooting position of the camera of FIG. 5.

This shooting position change detector DE is constructed in a form illustrated in FIG. 6. A small ball BL of electrically conducting material is contained in a square cross-sectional space with switches PW1 through PW4 at respective corners thereof so that when the ball BL stays in one of the lower corners, as the camera is held in the horizontal or vertical position, the switch PW1-PW4 in that corner is closed by the ball BL. It is to be noted that the detector DE of FIG. 6 is so oriented that a camera shooting position, when turned from the horizontal position by more than 45°, is taken as vertical.

Figure 7:
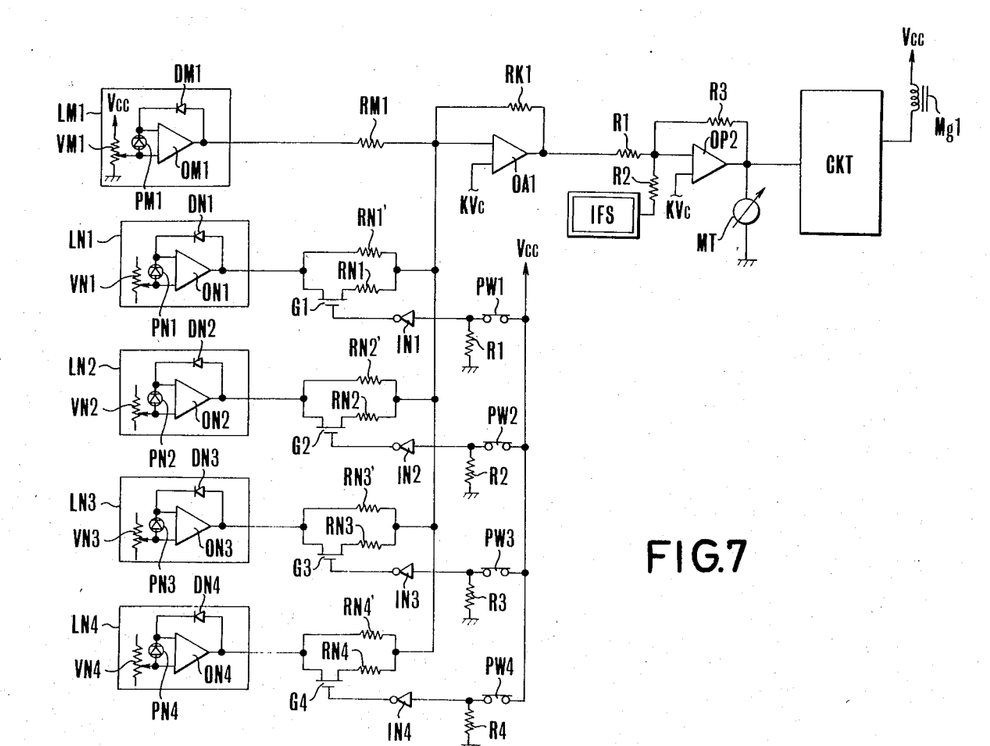
FIG. 7 is an electrical circuit diagram of a control circuit of the camera of FIG. 5.

Referring now to FIG. 7, the control circuit of the camera of FIG. 5 is shown and the same reference characters have been employed to denote parts similar to those shown in FIG. 3. Their detailed explanation is omitted here. In FIG. 7, reference symbols PW1-PW4 indentify the switches of FIG. 6. The resistors R1-R4 constitute switching circuits together with the aforesaid switches PW1-PW4. The resistors RN1-RN4, the resistors RN1'-RN4', the analog gates G1-G4 and inverters IN1-IN4 constitute a treatment circuit responsive to the outputs of the switching circuits for controlling the light meter SP sensitivity pattern. Reference symbols RM1, RK1 identify computation resistors; an operational amplifier OA1 computes the output of the first light metering circuit LM1 through the resistor RM1, with the outputs of the second light metering circuits LN1-LN4 through the treatment circuit.

The operation of the circuit of FIG. 7 is as follows: When the photographer holds the camera in the horizontal position, the electrically conducting ball BL in the shooting position change detector DE assumes the lower position under the action of gravity. The switch PW1 is thereby short-circuited, as shown in FIG. 6 turning off the analog gate G1 through the inverter IN1.

Therefore, the output of the first light metering circuit LM1 is applied through the resistor RM1 to the operational amplifier OA1, and the output of the second light metering circuit LN1 is applied through the resistor RN1' to the operational amplifier OA1, while the other outputs of the second light metering circuits LN2, LN3 and LN4 are applied through the respective pairs of parallel connected resistors RN2 and RN2', RN3 and RN3' and RN4 and RN4' to the operational amplifier OA1. The output of the operational amplifier OA1 is computed with the output of the exposure factor setting circuit IFS by the operational amplifier OP2 producing an exposure value which is displayed by the meter MT and which is also applied to the control circuit CKT for controlling the operation of the shutter ST through a solenoid Mg1.

It is to be understood that when in the horizontal shooting position, the contribution of the light metering circuit LN1 to the light value computation is reduced so that the influence of the sky is less. Also, when the photographer turns this camera to a vertical position, the electrically conducting ball BL in the shooting position change detector DE short-circuits the switch contacts PW4, thereby turning off the analog gate G4 through the inverter IN4.

Therefore, the output of the light metering circuit LM1 is applied through the resistor RM1 to the operational amplifier OA1, and the output of the light metering circuit LN4 is applied through the resistor RN4' to the operational amplifier OA1, while the other outputs of the light metering circuits LN1, LN2 and LN3 are applied through the respective pairs of resistors RN1 and RN1', RN2 and RN2' and RN3 and RN3' connected in parallel, to the operational amplifier OA1. The output of the operational amplifier OA1 is computed with the output of the exposure factor setting circuit IFS by the operational amplifier OP2 producing an exposure value which is displayed by the meter MT and which is also applied to the control circuit CKT for controlling the operation of the shutter ST through the solenoid Mg1.

It is to be understood that when in the vertical position, the contribution of the light metering circuit LN4 to the light value computation is reduced so that the influence of the sky is less.

Furthermore, when the camera is held in the reversed vertical position, the switch PW2 is closed by the ball BL, thereby the analog gate G2 is turned off through the inverter IN2. Therefore, the contribution of the light metering circuit LN2 to the light value computation is reduced so that the influence of the sky is less.

Though the position which follows is rare, when the camera is turned upside down, the ball BL closes the switch PW3, thereby turning off the analog gate G3 by the inverter IN3. Therefore when in the reversed horizontal position, the contribution of the light metering circuit LN3 to the light value computation is reduced so that the influence of the sky is less.

In the foregoing embodiment, the resistors R1–R4 are connected in parallel with the analog gates G1–G4. If each of the parallel circuits connected to these resistors R1–R4 is eliminated, the influence of the sky can be reduced to zero.

Figure 8:
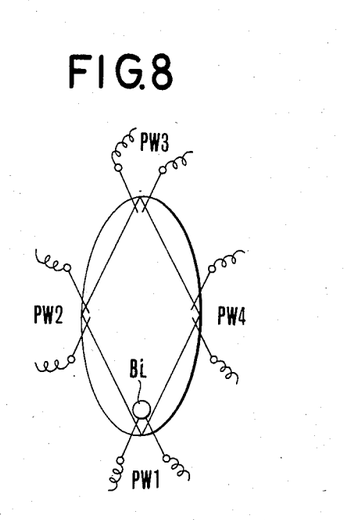
FIG. 8 is an elevational view of another embodiment of the shooting position difference detecting device of FIG. 6.

Also, although the shooting position change detector DE is constructed so that when the camera is inclined at an angle of 45° or more with the horizon, the emphasis distribution over the meter SP sensitivity pattern is changed from one for the horizontal position to the other for the vertical position. The shooting position change detector DE may be otherwise constructed in a vertically elongated form as illustrated in FIG. 8, so that when the camera is turned from the horizon by more than 60°, as the horizontal position is changed to a vertical position, the range of the shooting position assumed to be the horizontal position is widened. If the laterally elongated form is employed, the range of shooting positions assumed to be the vertical position is widened.

Figure 9:
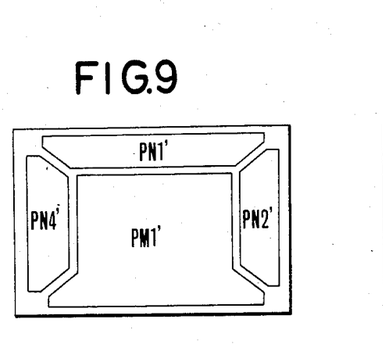
FIG. 9 is a plan view of another embodiment the meter sensitivity pattern usable in the cameras of FIGS. 1 and 5.
Figure 10:
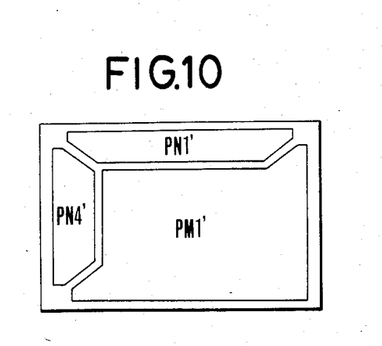
FIG. 10 shows still another embodiment.

It is also noted that though the foregoing embodiment has been described in conjunction with the use of five elements in the light sensor SP, it is also possible to use six or more sensor elements SP, considering their arrangement. Even the use of four or less light sensor elements SP is possible providing that a condition is set forth. When using four sensor elements SP, the condition is as illustrated in FIG. 9. In this situation, it is assumed that the reversed horizontal position of the camera is not encountered, and the light metering circuit LN3 of FIG. 7 is omitted. When using three sensor elements SP, the required meter pattern is as illustrated in FIG. 10. In this situation it is assumed that there is no possibility of holding the camera either in the upside down position or in the vertical position with the right hand side up and the left hand side down, since providing another release button used exclusively in the vertical positions in addition to a release button for use in the normal horizontal position leads to a greater possibility of taking the one-oriented vertical positions. In this situation the light metering circuits LN2 and LN3 are omitted. In FIG. 10, the influence of the outputs of the light metering circuits LN1 and LN4 is only lessened or removed, the position change detector DE may be replaced by means for selectively actuating the switches PW1 and PW4 in response respectively to operation of the release buttons for the normal and vertical positions.

As has been described above, according to the present invention, the camera can be operated in the overall field of view metering mode with exclusion of or with less emphasis on, only that portion of the surrounding area of the object which largely differs in brightness from the rest, thus making it possible to finely adjust the meter SP sensitivity pattern. Another great advantage is that not only under ordinary lighting conditions but also under abnormal lighting conditions where there is an extreme difference in brightness, as in back-lighting photography, theater photography or the like, an excellent photography can be obtained with well balanced exposure with respect to the emphasis on the principal object and the surrounding environment. Furthermore, the use of the shooting position change detector DE makes it possible for the camera to perceive where the sky is so that the influence of the sky on the object is either lessened or removed, thus greatly increasing the picture quality.

What I claim:
1. A light metering system for a camera including:
(a) first light metering means for measuring the central portion of an object, said means generating an electrical signal corresponding to the brightness of the central portion of the object;

(b) a plurality of second light metering means for metering brightness of the surrounding portion of the object, each of said second light metering means generating an electrical signal corresponding to the brightness of the surrounding portion of the object;

(c) computing means for computing an output of said first light metering means and outputs of said second light metering means;

(d) exposure control means for controlling the amount of exposure in accordance with an output of said computing means;

(e) comparison means for comparing the outputs of the first light metering means with those of the second light metering means; and (f) prevention means for preventing the output of each of said second light metering means from being added to said computing means, said prevention means preventing the operation of one or more of said second light metering means whose output is greater than a predetermined difference from the output of the first light metering means on the basis of the signal from the comparison means.

2. A light metering system for a camera including:

(a) first light metering means for measuring the central portion of an object, said means generating an electrical signal corresponding to the brightness of the central portion of the object;

(b) a plurality of second light metering means for metering brightness of the surrounding portion of the object, each of said second light metering means generating an electrical signal corresponding to the brightness of the surrounding portion of the object;

(c) computing means for computing an output of said first light metering means and outputs of said second light metering means;

(d) exposure control means for controlling the amount of exposure in accordance with an output of said computing means;

(e) comparison means for comparing the outputs of the first light metering means with those of the second light metering means; and (f) means for reducing the ratio of addition of the output of each of said second light metering means to the computing means, said means reducing the operation of one or more of said second light metering means whose output is greater than a predetermined difference from the output of said first light metering means.

* * * * *